United States Patent
Iura

(10) Patent No.: US 10,812,157 B2
(45) Date of Patent: Oct. 20, 2020

(54) WIRELESS DEVICE AND WIRELESS COMMUNICATION CONTROL METHOD

(71) Applicant: MITSUBISHI ELECTRIC CORPORATION, Tokyo (JP)

(72) Inventor: Hiroki Iura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/756,075

(22) PCT Filed: Dec. 7, 2017

(86) PCT No.: PCT/JP2017/044013
§ 371 (c)(1),
(2) Date: Apr. 14, 2020

(87) PCT Pub. No.: WO2019/111376
PCT Pub. Date: Jun. 13, 2019

(65) Prior Publication Data
US 2020/0259536 A1      Aug. 13, 2020

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0695* (2013.01); *H04B 7/088* (2013.01)

(58) Field of Classification Search
CPC .. H04B 7/0617; H04B 7/0408; H04B 7/0456; H04B 7/0417; H04B 7/0452;
(Continued)

(56) References Cited

U.S. PATENT DOCUMENTS

| 7,570,696 B2 * | 8/2009 | Maltsev | H04B 7/0634 375/260 |
| 2008/0019457 A1 * | 1/2008 | Waters | H04B 7/0634 375/267 |

(Continued)

FOREIGN PATENT DOCUMENTS

| JP | 2017-60138 A | 8/2015 |
| JP | 2017-507588 A | 3/2017 |

(Continued)

OTHER PUBLICATIONS

Wang et al., "Ilay MIMO BF Training Enhancements", IEEE 802.11-16/0100r1, IEEE, Jan. 18, 2016, Slides 1-14.

*Primary Examiner* — Emmanuel Bayard
(74) *Attorney, Agent, or Firm* — Birch, Stewart, Kolasch & Birch, LLP

(57) ABSTRACT

A wireless device according to the present invention is configured to execute a beamforming weight training function for acquiring in advance, by mutual communication between a base station and a terminal station, transmission quality information at a time when a combination of a base station beamforming weight and a terminal station beamforming weight is used, and identifying a suitable beamforming weight, and is configured to search for, based on the transmission quality information identified in the training step, a suitable beamforming weight while performing mutual communication, and execute processing of updating the suitable beamforming weight.

2 Claims, 11 Drawing Sheets

(51) Int. Cl.
*H04B 7/08* (2006.01)
*H04B 7/06* (2006.01)

(58) Field of Classification Search
CPC .. H04B 7/0413; H04B 7/0695; H04B 7/0862; H04B 7/088; H04L 1/06
USPC ................ 375/132, 267, 299, 346–347, 349
See application file for complete search history.

(56) References Cited

U.S. PATENT DOCUMENTS

| | | | | |
|---|---|---|---|---|
| 2008/0144737 A1* | 6/2008 | Naguib | ................ | H04L 1/0026 375/299 |
| 2011/0150066 A1* | 6/2011 | Fujimoto | ............... | H04B 7/086 375/224 |
| 2013/0040682 A1* | 2/2013 | Chang | ................ | H04B 7/0417 455/517 |
| 2013/0072247 A1* | 3/2013 | Park | ....................... | H04B 7/043 455/513 |
| 2013/0202054 A1* | 8/2013 | Khan | ....................... | H01Q 3/26 375/259 |
| 2013/0322558 A1* | 12/2013 | Harel | .................. | H04B 7/0634 375/267 |
| 2014/0146863 A1* | 5/2014 | Seol | ....................... | H04W 16/28 375/224 |
| 2016/0359533 A1* | 12/2016 | Obara | .................. | H04B 7/0456 |
| 2017/0294943 A1* | 10/2017 | Shen | ........................ | H04B 7/10 |
| 2018/0048363 A1* | 2/2018 | Okuyama | ............ | H04B 7/0456 |
| 2018/0109305 A1* | 4/2018 | Obara | .................. | H04B 7/0695 |
| 2019/0075515 A1 | 3/2019 | Obara et al. | | |

FOREIGN PATENT DOCUMENTS

| | | |
|---|---|---|
| WO | WO 2015/125891 A1 | 8/2015 |
| WO | WO 2017/154968 A1 | 9/2017 |

* cited by examiner

WIRELESS DEVICE AND WIRELESS COMMUNICATION CONTROL METHOD

TECHNICAL FIELD

The present invention relates to a wireless device and a wireless communication control method for improving communication performance.

BACKGROUND ART

In wireless communication, one method for achieving large-capacity communication is to broaden the signal bandwidth. For frequency bands of several GHz or less, frequencies are already assigned to a large number of systems, and it is thus difficult to secure a wide signal band of several hundred MHz or more. However, cellular communication requiring about several hundred meters or more as a communication area to be covered by one wireless base station is required to use a frequency band of several GHz or less.

For high frequency bands of several tens of GHz, there are many unassigned frequencies (available areas), and there is a high possibility that a wide signal bandwidth of several hundred MHz or more can be secured. However, attenuation with propagation distance is large in a high frequency band of several tens of GHz. For this reason, there is a disadvantage in that a wide communication area cannot be secured.

At high frequencies, the number of antenna elements that can be mounted in a fixed area can be greatly increased by utilizing the fact that the length of one wavelength is shorter. This enables a high-gain beam to be formed, to thereby compensate for attenuation with propagation distance.

In order to achieve large-capacity transmission, in addition to widening of the bandwidth, there is a technology called "super multi-element multiple-input, multiple-output (MIMO)" configured to spatially multiplex transmission signals by forming multiple beams with a large number of antenna elements. A super multi-element MIMO generally has a series of TX/RX circuits and a digital signal processing unit for each antenna element. For example, when there are 256 super multi-element MIMO elements, 256 digital signal processing units using a TX/RX circuit, an FPGA, an ASIC, and the like are required. Therefore, for super multi-element MIMOs, there is a problem in terms of cost and feasibility.

One solution to this problem is a hybrid beamforming (BF) antenna configuration. This antenna configuration is a method for implementing beam formation by an analog circuit including a variable amplifier or a variable phase shifter, instead of a digital signal processing unit. That is, this antenna configuration is a method of forming an analog beam (see, for example, Patent Literature 1).

With this method, the number of required digital signal processing units is not the same as the number of antenna elements, but is the same as the number of beams to be formed. As a result, when one analog beam is to be formed by 16 antenna elements, the number of digital signal processing units can be reduced to ¹⁄₁₆.

Such analog beam formation corresponds to the New Radio standard antenna configuration in the 3rd Generation Partnership Project (3GPP), which is a standardization organization for terrestrial mobile communication systems.

A transmission weight to be used when the analog beam is to be formed is appropriately selected from among a transmission weight group called "code book". Further, in order to transmit a plurality of streams, in a downlink, a plurality of analog beams are assigned to one user terminal at a transmission station. The streams transmitted by the plurality of analog beams are pre-processed (digitally precoded) in a digital signal processing unit included in the transmission station. Examples of such pre-processing include spatial filtering by a zero-forcing method, in which inter-stream interference is removed.

As such an analog beam allocation method, there has been proposed a two-stage control method, in which analog beam control and digital precoding control are completely separated for high-speed transmission beam selection of analog beams (see, for example, Patent Literature 1).

CITATION LIST

Patent Literature

[PTL 1] WO 2015/125891 A1

SUMMARY OF INVENTION

Technical Problem

However, the related art has the following two problems.
Searching for suitable BF weights for the base stations and terminals is performed sequentially for each antenna. As a result, the training time from the start of the suitable BF weight search to the start of communication is long.
Moreover, the selected suitable BF weight is not readjusted. As a result, the possibility that an appropriate BF weight is selected is low.

The present invention has been made in order to solve the above-mentioned problems, and has an object to obtain a wireless device and a wireless communication control method for shortening the time from the start of a BF weight search to the start of communication and sequentially optimizing a BF weight.

Solution to Problem

According to one embodiment of the present invention, there is provided a wireless device including a base station and a terminal station, the base station including: a precoder unit configured to perform digital precoding on a plurality of pieces of parallel user data by using a precoding weight; a transmission beamforming unit configured to perform, on a signal on which the digital precoding has been performed, analog base station beamforming for conferring a change in phase and amplitude corresponding to a base station beamforming weight; and a plurality of transmission antennas configured to transmit the signal on which the analog base station beamforming has been performed, the terminal station including: a plurality of reception antennas configured to receive a signal transmitted from the base station and propagated into space; a terminal station beamforming unit configured to perform, on the signal received by the plurality of reception antennas, analog terminal station beamforming for conferring a change in phase and amplitude corresponding to a terminal station beamforming weight; and a postcoding unit configured to reproduce the plurality of pieces of parallel user data by using a postcoding weight to perform digital postcoding on the signal on which the analog terminal station beamforming has been performed, the base station and the terminal station being configured to execute: a beamforming weight training function for acquiring in advance transmission quality information at a time when a combination of the base station beamforming weight and the terminal station beamforming weight is used, and identifying a suitable beamforming weight; and a suitable beamforming weight search function for searching for, based on the transmission quality information identified by executing the beamforming weight training function, a suitable beamforming weight while performing mutual communication, and executing processing of updating the suitable beamforming weight.

Further, according to one embodiment of the present invention, there is provided a wireless communication control method to be executed in the wireless device of one embodiment of the present invention by mutual communication between the base station and the terminal station, the wireless communication control method including: a training step of executing a beamforming weight training function for acquiring in advance transmission quality information at a time when a combination of a base station beamforming weight and a terminal station beamforming weight is used, and identifying a suitable beamforming weight; and a search step of searching for, based on the transmission quality information identified in the training step, a suitable beamforming weight while performing mutual communication, and executing processing of updating the suitable beamforming weight.

Advantageous Effects of Invention

According to the present invention, there are provided the configuration in which a suitable BF weight is set collectively for all antennas by a simple method, and the configuration in which a suitable BF weight is used as an initial value, the channel capacity at the time when the BF weight is changed from the initial value is sequentially evaluated, and a more appropriate BF weight is searched for while communication is being performed. As a result, it is possible to provide the wireless device and the wireless communication control method for shortening the time from the start of the BF weight search to the start of communication and sequentially optimizing the BF weight.

DESCRIPTION OF EMBODIMENTS

Now, with reference to the drawings, a wireless device and a wireless communication control method according to preferred embodiments of the present invention are described.

First Embodiment

Figure 1:
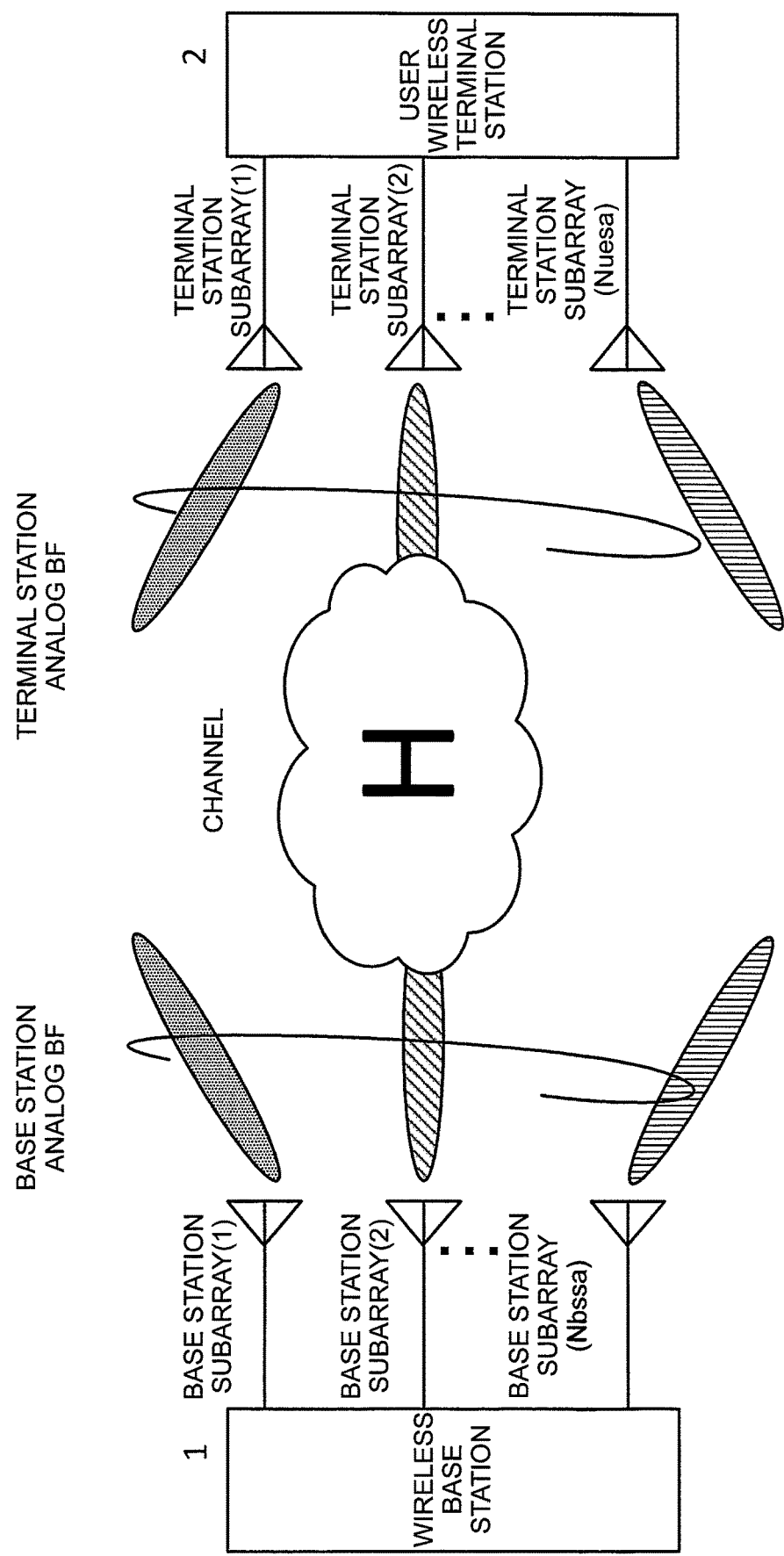
FIG. 1 is a schematic configuration diagram of a wireless communication system assumed in a first embodiment of the present invention.

FIG. 1 is a schematic configuration diagram of a wireless communication system assumed in a first embodiment of the present invention. In the wireless communication system in the first embodiment, a wireless base station 1 (hereinafter referred to as "base station 1") having a hybrid BF antenna configuration and one user wireless terminal 2 (hereinafter referred to as "terminal station 2") similarly having a hybrid BF antenna configuration are configured to perform communication to and from each other.

The base station 1 has Nbssa base station subarrays. The terminal station 2 has Nuesa terminal station subarrays.

Each subarray is an element antenna group obtained by dividing the element antennas included in each station into a plurality of groups. An antenna pattern (beam) of the subarray is formed by appropriately setting a variable phase shifter and a variable amplifier included in the subarray.

A hybrid BF antenna is an antenna system including an analog BF (hereinafter referred to as "BF") and a precoder/postcoder. The BF is configured to form antenna directivity by synthesizing a signal in which a phase amplitude of an analog signal has been adjusted by the base station/terminal station subarray. The precoder/postcoder is configured to synthesize a signal in which the phase amplitude of a digital signal has been adjusted.

Figure 2:
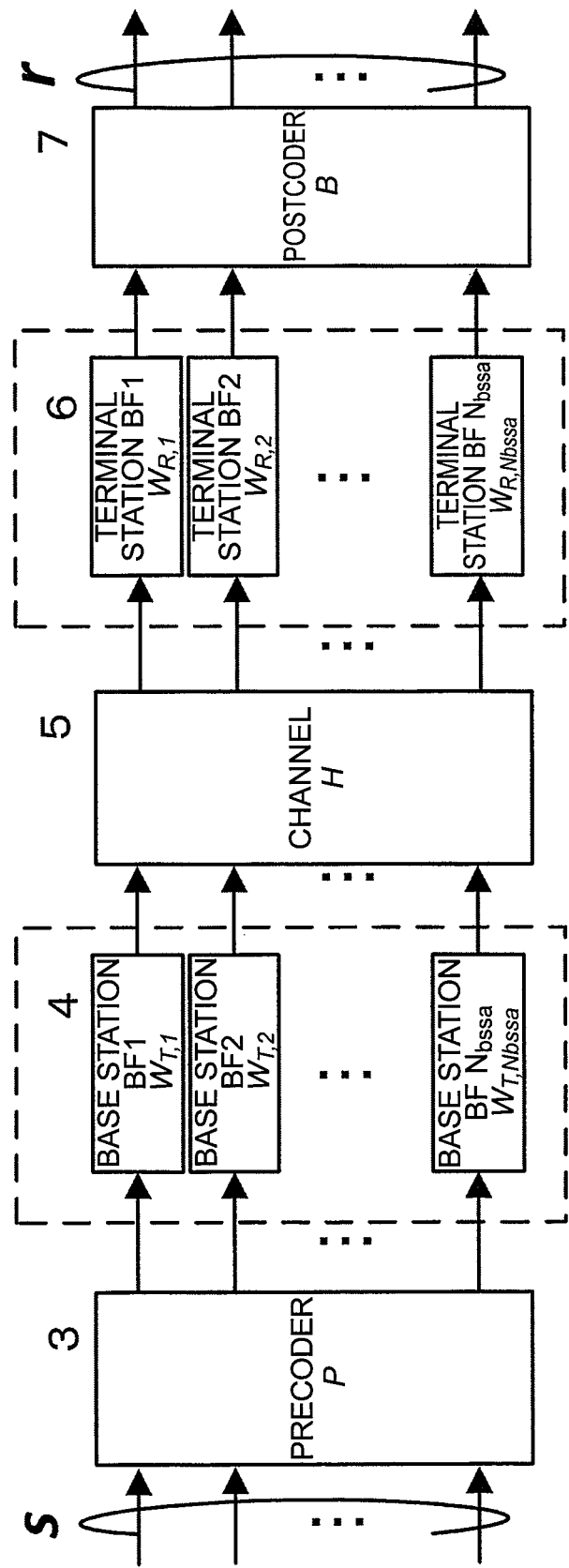
FIG. 2 is a block diagram in a case in which data is transmitted from a base station to a terminal station in the first embodiment of the present invention.

FIG. 2 is a block diagram in a case in which data is transmitted from the base station to the terminal station in the first embodiment of the present invention. A precoder matrix at a precoder 3 is represented by P, a base station BF matrix at a base station 4 is represented by WT, a channel matrix at a channel 5 is represented by H, a terminal station BF matrix at a terminal station 6 is represented by WR, and a postcoder matrix at a postcoder 7 is represented by B. A demodulated signal vector r can be expressed by the following expression (1) through use of a transmission signal s.

$$r = BW_R HW_T Ps \tag{1}$$

In this expression, the transmission signal s is determined by the following expression (2).

$$s = \begin{bmatrix} s1 \\ \cdots \\ s_{N_s} \end{bmatrix} \tag{2}$$

The precoder matrix P is determined by the following expressions (3) and (4).

$$P = [\, p_1 \ \cdots \ p_{N_s} \,] \tag{3}$$

$$p_i = \begin{bmatrix} p_{i,1} \\ \cdots \\ p_{i,N_{bssa}} \end{bmatrix} \tag{4}$$

The base station BF matrix WT is determined by the following expressions (5) to (7), in which Nbssa represents the number of element antennas included in one base station subarray.

$$W_T = \mathrm{diag}[\, \omega_{t,1} \ \omega_{t,2} \ \cdots \ \omega_{t,N_{bssa}} \,] \tag{5}$$

$$= \begin{bmatrix} \omega_{t,1} & 0 & \cdots & 0 \\ 0 & \omega_{t,2} & \ddots & 0 \\ 0 & 0 & \ddots & 0 \\ \vdots & \vdots & \ddots & \vdots \\ 0 & 0 & \ddots & \omega_{t,N_{bssa}} \end{bmatrix} \tag{6}$$

$$\omega_{t,i} = [\, \omega_{t,i,1} \ \cdots \ \omega_{t,i,N_{bssa}} \,]^T \tag{7}$$

The channel matrix H is determined by the following expression (8).

$$H = \begin{bmatrix} h_{1,1} & h_{1,2} & \cdots & h_{1,N_{bss}N_{bssa}} \\ \vdots & \vdots & \ddots & \vdots \\ h_{N_{ues}N_{uesa},1} & h_{N_{ues}N_{uesa},2} & \cdots & h_{N_{ues}N_{uesa},N_{bss}N_{bssa}} \end{bmatrix} \tag{8}$$

The terminal station BF matrix WR is determined by the following expressions (9) to (11), in which Nuesa represents the number of element antennas included in one terminal station subarray.

$$W_R = \mathrm{diag}[\, \omega_{r,1} \ \omega_{r,2} \ \cdots \ \omega_{r,N_{bssa}} \,] \tag{9}$$

$$= \begin{bmatrix} \omega_{r,1} & 0 & \cdots & 0 \\ 0 & \omega_{r,2} & \ddots & 0 \\ 0 & 0 & \ddots & 0 \\ \vdots & \vdots & \ddots & \vdots \\ 0 & 0 & \ddots & \omega_{r,N_{uesa}} \end{bmatrix} \tag{10}$$

$$\omega_{r,i} = [\, \omega_{r,i,1} \ \cdots \ \omega_{r,i,N_{ues}} \,]^T \tag{11}$$

The postcoder matrix B is determined by the following expressions (12) and (13).

$$B = [\, b_1 \ \cdots \ b_{N_s} \,] \tag{12}$$

$$b_i = \begin{bmatrix} b_{i,1} \\ \cdots \\ b_{i,N_{uesa}} \end{bmatrix} \tag{13}$$

In a modem of the base station and the terminal station, only the following expression (14) reflecting the base station BF and the terminal station BF can be recognized and measured.

$$H_{sa} = W_R H W_T \tag{14}$$

For example, the precoder matrix P and the postcoder matrix B are V and $U^H$ in the eigenvalue decomposition $U\Sigma V^H$ of Hsa, respectively. Therefore, a unique MIMO can be transmitted, as shown in the following expressions (15) to (17).

$$r = BW_R H W_T Ps \tag{15}$$

$$= B H_{sa} Ps \tag{16}$$

$$= U^H U \Sigma V^H V s \tag{17}$$

In this expression, U and $V^H$ represent unitary matrices, and therefore the expression (17) can be rewritten as the following expression (18).

$$r = \Sigma s \tag{18}$$

Σ represents a diagonal matrix, and it can be seen that the data is demodulated at the terminal station without interference.

Figure 3:
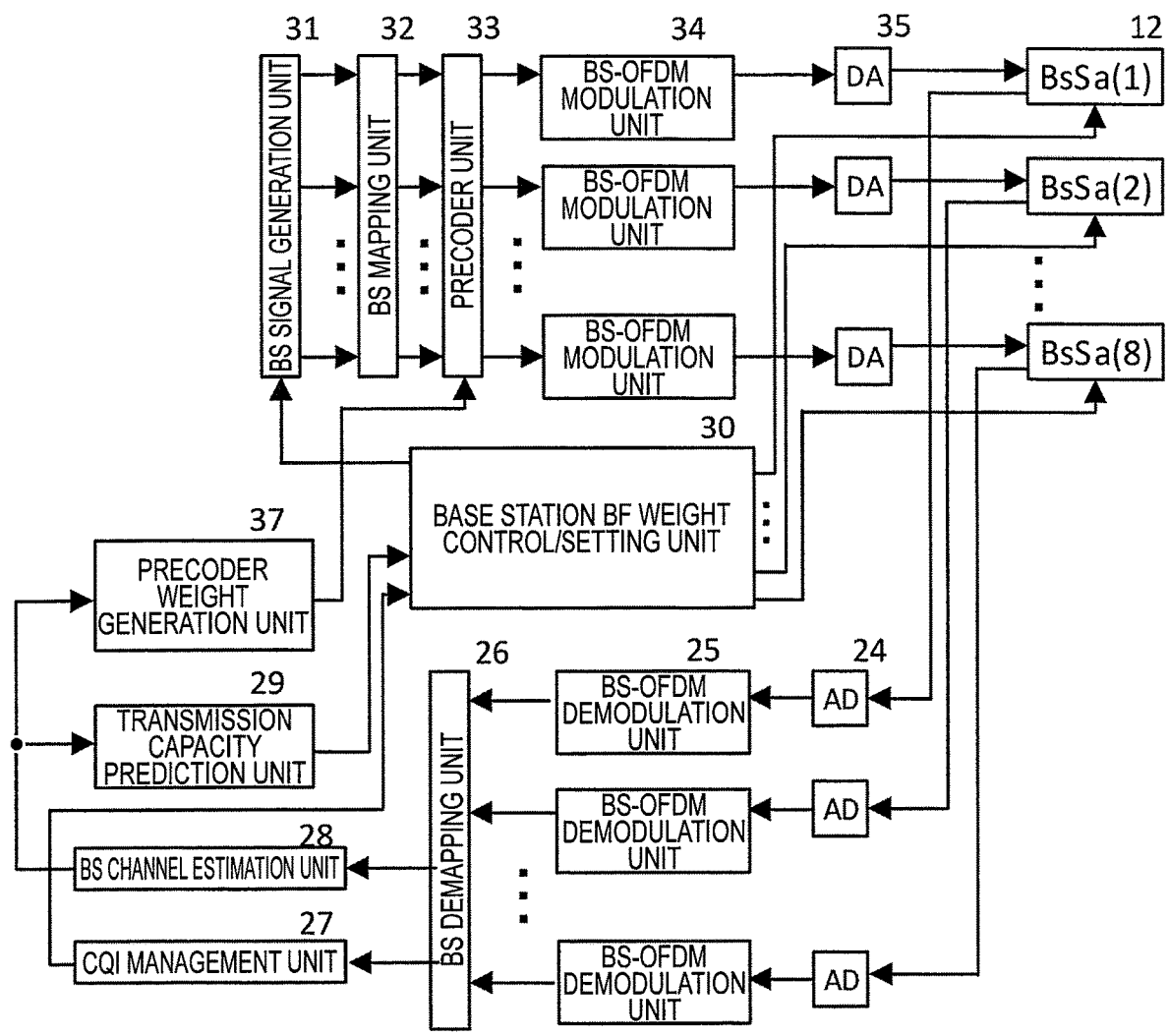
FIG. 3 is a configuration diagram of the base station in the first embodiment of the present invention.

Next, a device configuration of the base station is described with reference to FIG. 3 and FIG. 4. FIG. 3 is a configuration diagram of the base station 1 in the first embodiment of the present invention. The base station 1 in the first embodiment includes Nbssa base station subarrays 12 (hereinafter referred to as "BsSa").

Figure 4:
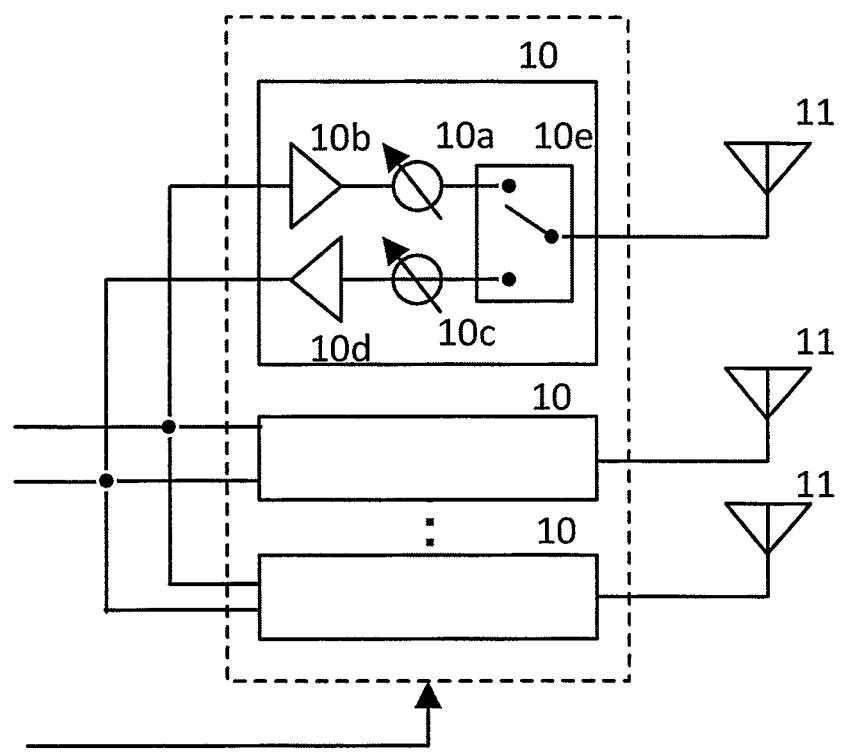
FIG. 4 is an internal configuration diagram of a BsSa in the first embodiment of the present invention.

FIG. 4 is an internal configuration diagram of the BsSa 12 in the first embodiment of the present invention. The BaSa 12 includes therein Nbssa transmission/reception units 10 and antenna elements 11. Each transmission/reception unit 10 includes a TX variable phase shifter 10a, a TX variable amplifier 10b, an RX variable phase shifter 10c, an RX variable amplifier 10d, and a switch 10e.

A BS signal generation unit 31 is configured to generate transmission signal bit data based on information on a BF training reference signal, a terminal station BF weight setting information signal, a data demodulation reference signal, and user data information.

The BF training reference signal is a signal for acquiring the power characteristic obtained with the set base station and terminal station BF weights. The terminal station BF weight setting information signal is a signal including instruction information on the BF weight of the terminal station, which is set by a terminal station BF weight control/setting unit 39 described later.

The data demodulation reference signal is a reference signal for performing downlink channel estimation at the terminal station. A postcoder weight is determined by using this channel estimation. The user data signal is a user data signal to be transmitted to the terminal station 2.

A BS mapping unit 32 is configured to map the signal generated by the BS signal generation unit 31 on an OFDM resource, which is a rectangular area in an OFDM symbol direction and a subcarrier direction, in accordance with a mapping rule.

A precoder unit 33 is configured to multiply the input signal by a precoder weight P, which is input from a precoder weight generation unit 37.

A BS-OFDM modulation unit 34 is configured to convert frequency-axis data into time-axis data by IFFT processing. The BS-OFDM modulation unit 34 also adds a guard interval (GI) to the time-axis data in order to remove the influence of a delayed wave.

A DA 35 is configured to convert a time-axis digital signal into an analog signal, and to transmit downlink data from base station 1 to the terminal station 2. An AD 24 is configured to convert an analog signal into a digital signal, and to receive uplink data from the terminal station 2 to the base station 1.

A BS-OFDM demodulation unit 25 is configured to convert time-axis data into frequency-axis data by GI removal and FFT processing.

A BS demapping unit 26 is configured to extract demodulated CSI acquisition reference signal information in the subcarrier direction, which is frequency-axis data, or decoded bit data. "CSI" means "channel state information".

A CQI management unit 27 is configured to acquire downlink radio signal strength indicator (RSSI) information based on the combination of a base station BF weight candidate and a terminal station BF weight candidate decoded by the BS demapping unit, and to accumulate the RSSI information for the BF weight combination.

A BS channel estimation unit 28 is configured to estimate a channel matrix Hsa from the signal points of the CSI acquisition reference signal extracted by the BS demapping unit 26.

A transmission capacity prediction unit 29 is configured to calculate the channel capacity that can be transmitted between the base station and the terminal station, from the channel matrix Hsa estimated by the BS channel estimation unit 28.

A base station BF weight control/setting unit 30 is configured to set, in the BS signal generation unit 31, control information for reporting to a terminal station a base station BF weight setting to the BsSa 12 and a terminal station BF weight setting, based on the prediction result from the transmission capacity prediction unit 29 and the CQI information from the CQI management unit 27.

Figure 5:
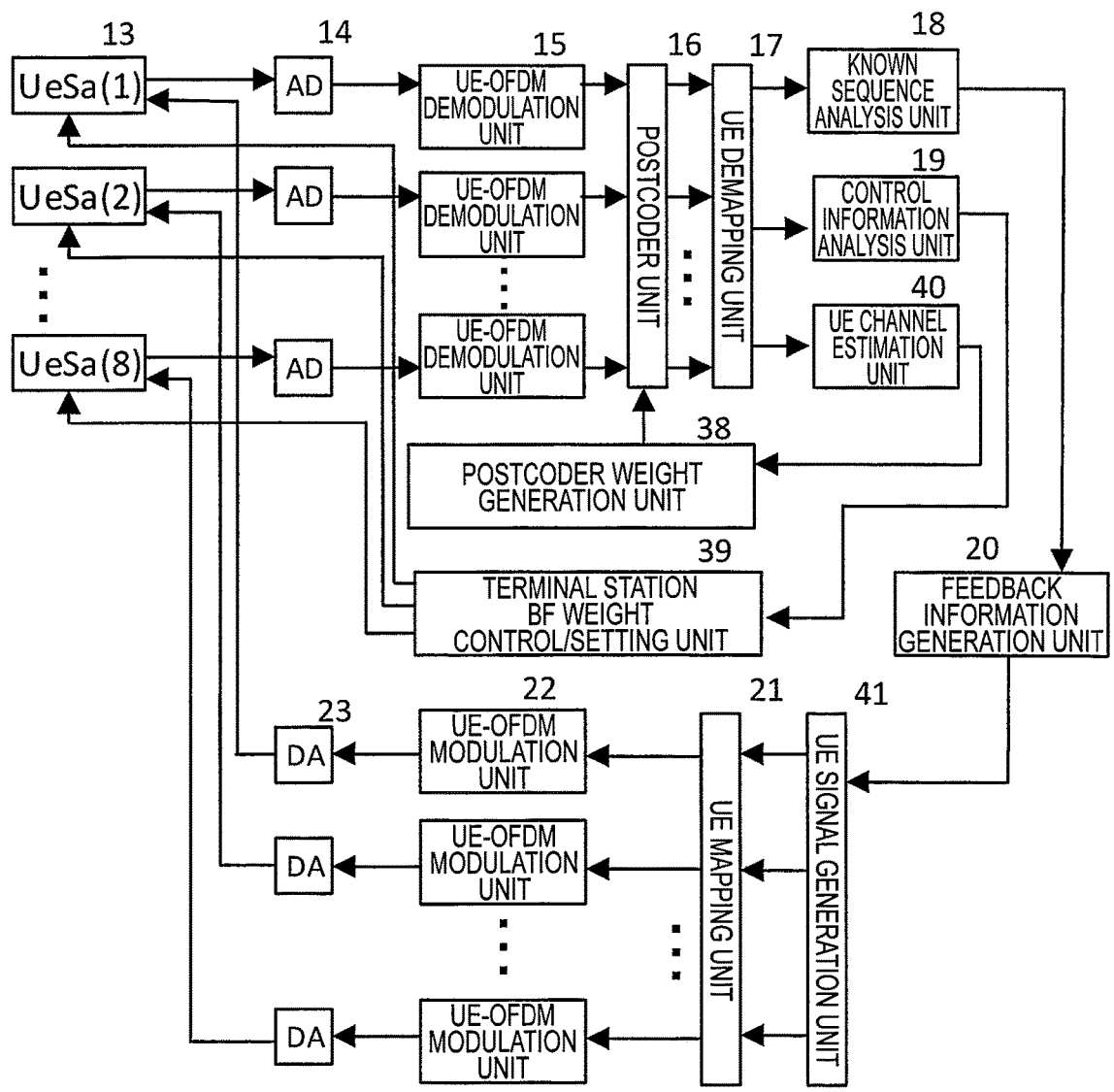
FIG. 5 is a configuration diagram of the terminal station in the first embodiment of the present invention.

Next, a device configuration of the terminal station is described with reference to FIG. 5. FIG. 5 is a configuration diagram of the terminal station 2 in the first embodiment of the present invention. The terminal station 2 in the first embodiment has Nuesa terminal station subarrays 13 (hereinafter referred to as "UeSa").

The configuration of a UeSa 13 is the same as that in FIG. 4 for illustrating the configuration of a BsSa 12. Specifically, the UeSa 13 includes therein Nuesa transmission/reception units 10 and antenna elements 11. Each transmission/reception unit 10 includes a TX variable phase shifter 10a, a TX variable amplifier 10b, an RX variable phase shifter 10c, an RX variable amplifier 10d, and a switch 10e.

An AD 14 is configured to convert an analog signal received via the UeSa 13 into a digital signal, and to receive downlink data transmitted from the base station 1 to the terminal station 2. A DA 23 is configured to convert a time-axis digital signal into an analog signal, and to transmit uplink data from the terminal station 2 to the base station 1.

A UE-OFDM demodulation unit 15 is configured to convert time-axis data into frequency-axis data by GI removal and FFT processing.

A postcoder unit 16 is configured to multiply the input signal by a postcoder weight B input from a postcoder weight generation unit 38.

A UE demapping unit 17 is configured to extract a demodulated BF training reference signal in the subcarrier direction, which is frequency-axis data, to input the extracted BF training reference signal to a known sequence analysis unit 18. The UE demapping unit 17 also extracts a terminal station BF weight setting information signal to input the extracted terminal station BF weight setting information signal to a control information analysis unit 19. The UE demapping unit 17 also extracts a data demodulation reference signal to input the data demodulation reference signal to a UE channel estimation unit 40.

The known sequence analysis unit 18 is configured to calculate the power characteristic of the combination of the set base station BF weight and the terminal station BF weight by analyzing the BF training reference signal.

The control information analysis unit 19 is configured to analyze the terminal station BF weight setting information signal to obtain BF weight information to be set in the terminal station BF weight control/setting unit 39.

The terminal station BF weight control/setting unit 39 is configured to determine a setting value of the variable phase shifter and a setting value of the variable amplifier to be set in the UeSa (1) to UeSa (8), based on the BF weight information set in the UeSa input from the control information analysis unit 19.

The UE channel estimation unit 40 is configured to analyze the data demodulation reference signal to estimate a channel matrix Hsa between transmission and reception.

The postcoder weight generation unit 38 is configured to generate a postcoder weight based on the channel matrix Hsa from the UE channel estimation unit 40 by using, for example, a MIMO demodulation algorithm such as a zero-forcing (ZF) method.

The feedback information generation unit 20 is configured to convert the power characteristic of the combination of the base station BF weight and the terminal station BF weight calculated by the known sequence analysis unit 18 into feedback data information, to input the feedback data information to a UE signal generation unit 41.

The UE signal generation unit 41 is configured to generate transmission signal bit data based on any of the feedback data information on the power characteristic of the combination of the base station BF weight and the terminal station BF weight input from the feedback information generation unit 20, a CSI acquisition reference signal for acquiring uplink channel information, and user data information.

A UE mapping unit 21 is configured to map the signal generated by the UE signal generation unit 41 on the OFDM resource, which is a rectangular area in the OFDM symbol direction and the subcarrier direction, in accordance with a mapping rule.

A UE-OFDM modulation unit 22 is configured to convert frequency-axis data into time-axis data by IFFT processing. The UE-OFDM modulation unit 22 also adds a guard interval (GI) to the time-axis data in order to remove the influence of a delayed wave.

Next, an operation procedure of the wireless device according to the first embodiment is described.

Figure 6:
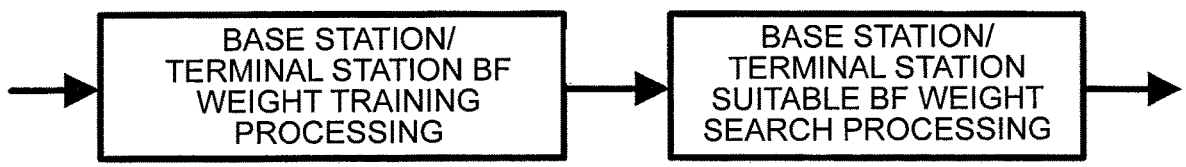
FIG. 6 is a diagram for illustrating an overall flow in a wireless device according to the first embodiment of the present invention.

FIG. 6 is a diagram for illustrating an overall flow in the wireless device according to the first embodiment of the present invention. The processing to be executed by the wireless device according to the first embodiment includes two steps, namely, "base station/terminal station BF weight training processing" of measuring a reception signal power of all the combinations of the BF weight candidates of the base station 1 and the terminal station 2, and in the next step, "base station/terminal station suitable BF weight search processing" of searching for a suitable BF weight based on the reception signal power information measured in the first step.

Figure 7:
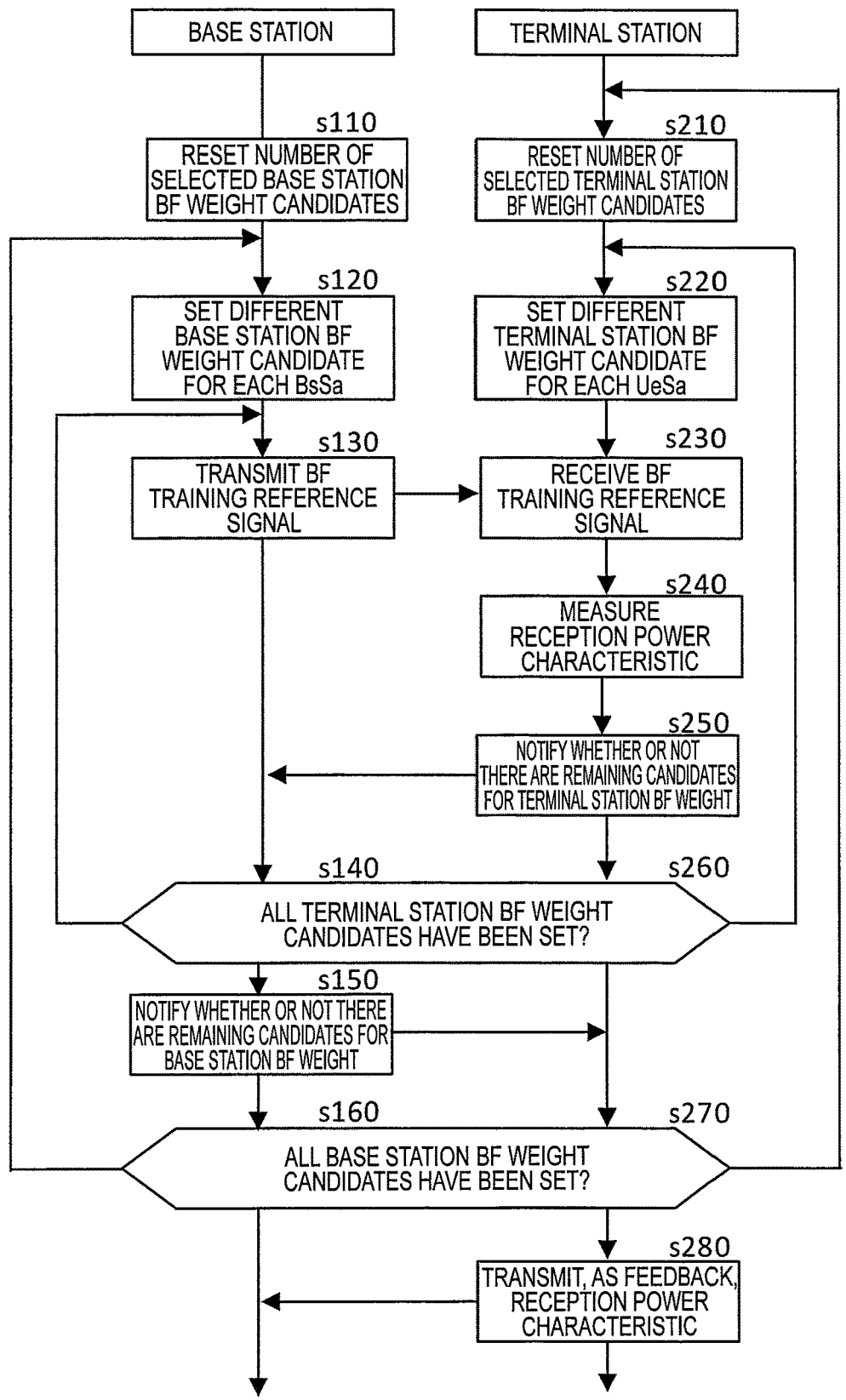
FIG. 7 is a diagram for illustrating a detailed procedure of "base station/terminal station BF weight training processing" in the first embodiment of the present invention.

Next, the base station/terminal station BF weight training processing is described in detail. FIG. 7 is a diagram for illustrating a detailed procedure of the "base station/terminal station BF weight training processing" in the first embodiment of the present invention. This procedure mainly includes three methods, namely, a BF weight combination quality measurement method, a BF training signal generation method, and a BF weight combination quality feedback method.

The BF weight combination quality measurement method corresponds to the processing of Step S110 to Step S160 and Step S210 to Step S270. The BF training signal generation method corresponds to Step S130 and the processing of generating the BF training reference signal illustrated in FIG. 8, which is described later. The BF weight combination quality feedback method corresponds to the processing of Step S280.

In Step S110, the base station 1 sets the number of selected base station BF weight candidates to 0. Similarly, in Step S210, the terminal station 2 sets the number of selected terminal station BF weight candidates to zero.

Next, in Step S120, the base station 1 sets a different base station BF weight candidate for each BsSa by using the base station BF weight control/setting unit 30, and updates the number of selected base station BF weight candidates.

Similarly, in Step S220, the terminal station 2 sets a different terminal station BF weight candidate for each UeSa by using the terminal station BF weight control/setting unit 39, and updates the number of selected terminal station BF weight candidates.

Figure 8:
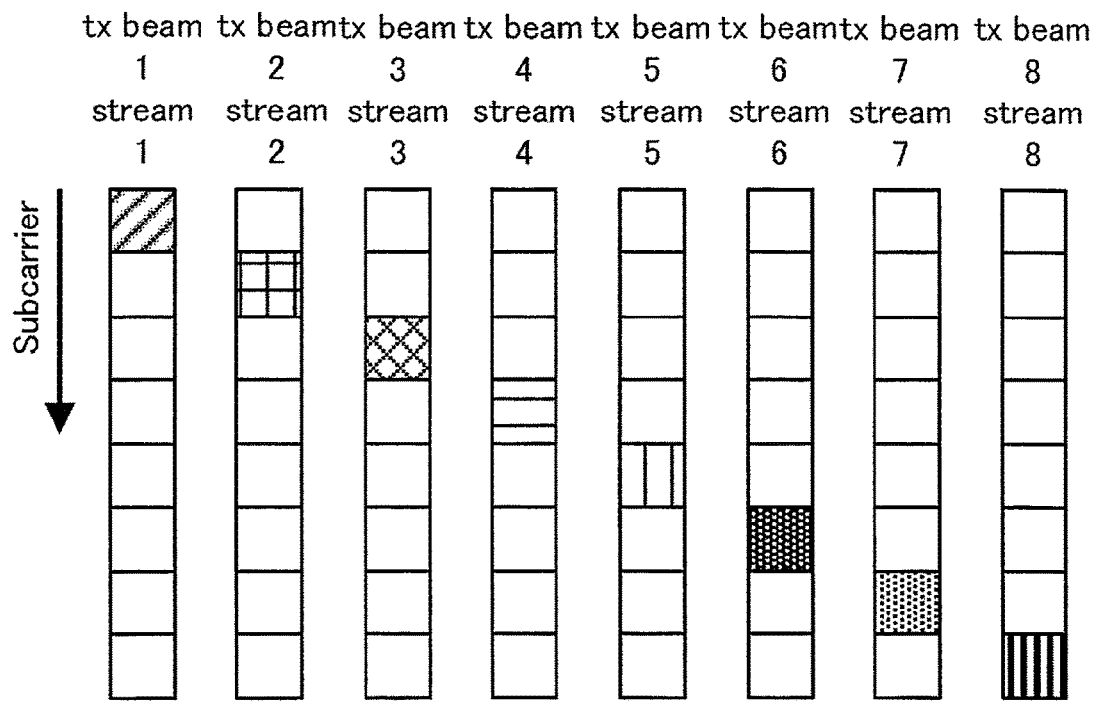
FIG. 8 is an explanatory diagram for illustrating a transmission example of a BF training reference signal in the first embodiment of the present invention.

Next, in Step S130, the base station 1 transmits a BF training reference signal. FIG. 8 is an explanatory diagram for illustrating a transmission example of the BF training reference signal in the first embodiment of the present invention. Under a state in which different BF weight candidates have been set in the base station and the terminal station in Step S120 and Step S220, the base station 1 generates and transmits a BF training reference signal having a format in which, as illustrated in FIG. 8, a reference signal is arranged at a different subcarrier position for each different base station subarray.

At this time, the BF training reference signal is generated by the BS signal generation unit 31 in accordance with an instruction from the base station BF weight control/setting unit 30. The generated BF training reference signal is then transmitted via the BS mapping unit 32, the precoder unit 33, the BS-OFDM modulation unit 34, the DA 35, and the BsSa 12.

At this time, the precoder unit 33 multiplies a unit matrix I as a precoder weight. Therefore, the operation is performed in essence without a precoder. In this first embodiment, Nbssa=8 is set as an example.

Figure 9:
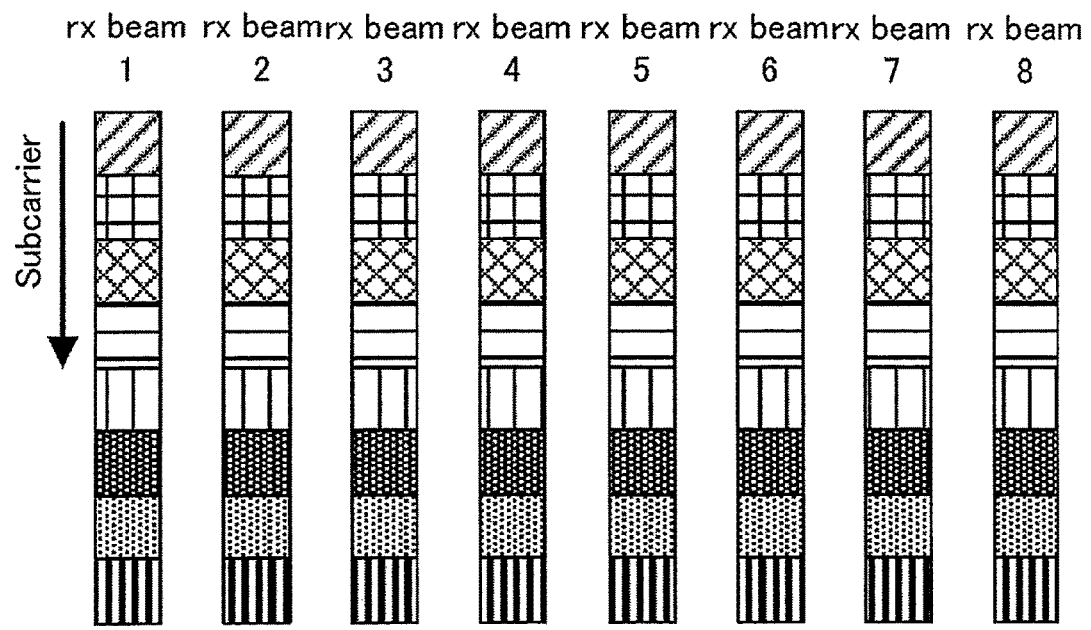
FIG. 9 is an explanatory diagram for illustrating a reception example of the BF training reference signal in the first embodiment of the present invention.

FIG. 9 is an explanatory diagram for illustrating a reception example of the BF training reference signal in the first embodiment of the present invention. In Step S230, the terminal station 2 can receive the BF training signal illustrated in FIG. 9 without interference even when a plurality of BsSas for which different BF weight candidates are set simultaneously transmit signals.

The BF training signal is received by the terminal station 2 via the UeSa 13, the AD 14, the UE-OFDM demodulation unit 15, the postcoder unit 16, the UE demapping unit 17, and the known sequence analysis unit 18. At this time, the postcoder unit 16 multiplies the unit matrix I as a postcoder weight. Therefore, the operation is performed in essence without a postcoder. In this first embodiment, Nuesa=8 is set as an example.

In each UeSa, a BF training reference signal transmitted with a different base station BF weight is arranged in the subcarrier direction. For this reason, the terminal station 2 can obtain reception data for a total of Nuesa×Nbssa=64 combinations of BF training reference signals, namely, combinations of 8 types of base station BF weights Nbssa and 8 types of terminal station BF weights Nuesa.

In Step S240, the terminal station 2 measures the signal power of the BF training reference signal of each subcarrier and each subarray received by each UeSa. The terminal station 2 grasps in advance the order in the subcarrier direction and in the time direction of the BF training reference signal for which the base station BF weight is to be applied in BF training. Therefore, the terminal station 2 can uniquely identify which base station BF weight and which terminal station BF weight form the combination of the measured signal power of the BF training reference signal.

In Step S250, the terminal station 2 notifies whether or not there are remaining candidates for the terminal station BF weight. Specifically, the terminal station 2 notifies, to the base station 1, the numerical value of "Nue; BF-Nue; BF; set", or a flag indicating whether or not "Nue; BF-Nue; BF; set"≤0, where:

"Nue; BF" represents the number of terminal station BF weight candidates; and

"Nue; BF; set" represents a total value of the number of candidate weights already set in Step S220.

In Step S140, when "Nue; BF-Nue; BF; set">0, the base station 1 returns to Step S130. Similarly, in Step S260, when "Nue; BF-Nue; BF; set">0, the terminal station 2 returns to Step S220.

In other words, when "Nue; BF-Nue; BF; set">0, the base station 1 and the terminal station 2 fix the base station BF weight candidate, change the terminal station BF weight candidate, and continue the training. The base station 1 repeats Step S130 to Step S140 and the terminal station 2 repeats Step S220 to Step S260 until "Nue; BF-Nue; BF; set"≤0. As a result, the terminal station 2 can ultimately acquire the power characteristic of all the terminal station BF weight candidates.

Next, in Step S150, the base station 1 notifies whether or not there are remaining candidates for the base station BF weight. Specifically, the base station 1 notifies, to the terminal station 2, the numerical value of "Nbs; BF-Nbs; BF; set", or a flag indicating whether or not "Nbs; BF-Nbs; BF; set"≤0, where:

"Nbs; BF" represents the number of base station BF weight candidates; and

"Nbs; BF; set" represents a total value of the number of candidate weights already set in Step S120.

In Step S160, when "Nbs; BF-Nbs; BF; set">0, the base station 1 returns to Step S120. Similarly, in Step S270, when "Nbs; BF-Nbs; BF; set">0, the terminal station 2 returns to Step S210.

In other words, when "Nbs; BF-Nbs; BF; set">0, the base station 1 and the terminal station 2 change the base station BF weight candidate, reset the number of selected terminal station BF weight candidates, and again perform training of all the terminal station BF weight candidates. The base station 1 repeats Step S120 to Step S160 and the terminal station 2 repeats Step S210 to Step S270 until "Nbs; BF-Nbs; BF; set"≤0. As a result, the terminal station 2 can ultimately acquire a power characteristic for all the combinations of the base station/terminal station BF weight candidates.

Finally, in Step S280, the terminal station 2 generates, by using the feedback characteristic generation unit 20, as feedback information, the power characteristic for all the combinations of the base station/terminal station BF weight candidates acquired in the previous Step S240. The terminal station 2 transmits, as feedback, the generated feedback information to the base station 1 via the UE signal generation unit 41, the UE mapping unit 21, the UE-OFDM modulation unit 22, the DA 23, and the UeSa 13.

Meanwhile, the base station 1 acquires the power characteristic for all the combinations of the base station/terminal station BF weight candidates by receiving the feedback information via the BsSa 12, the AD 24, the BS-OFDM demodulation unit 25, the BS demapping unit 26, and the CQI management unit 27.

Next, a method of searching for a suitable BF weight is described.

Figure 10:
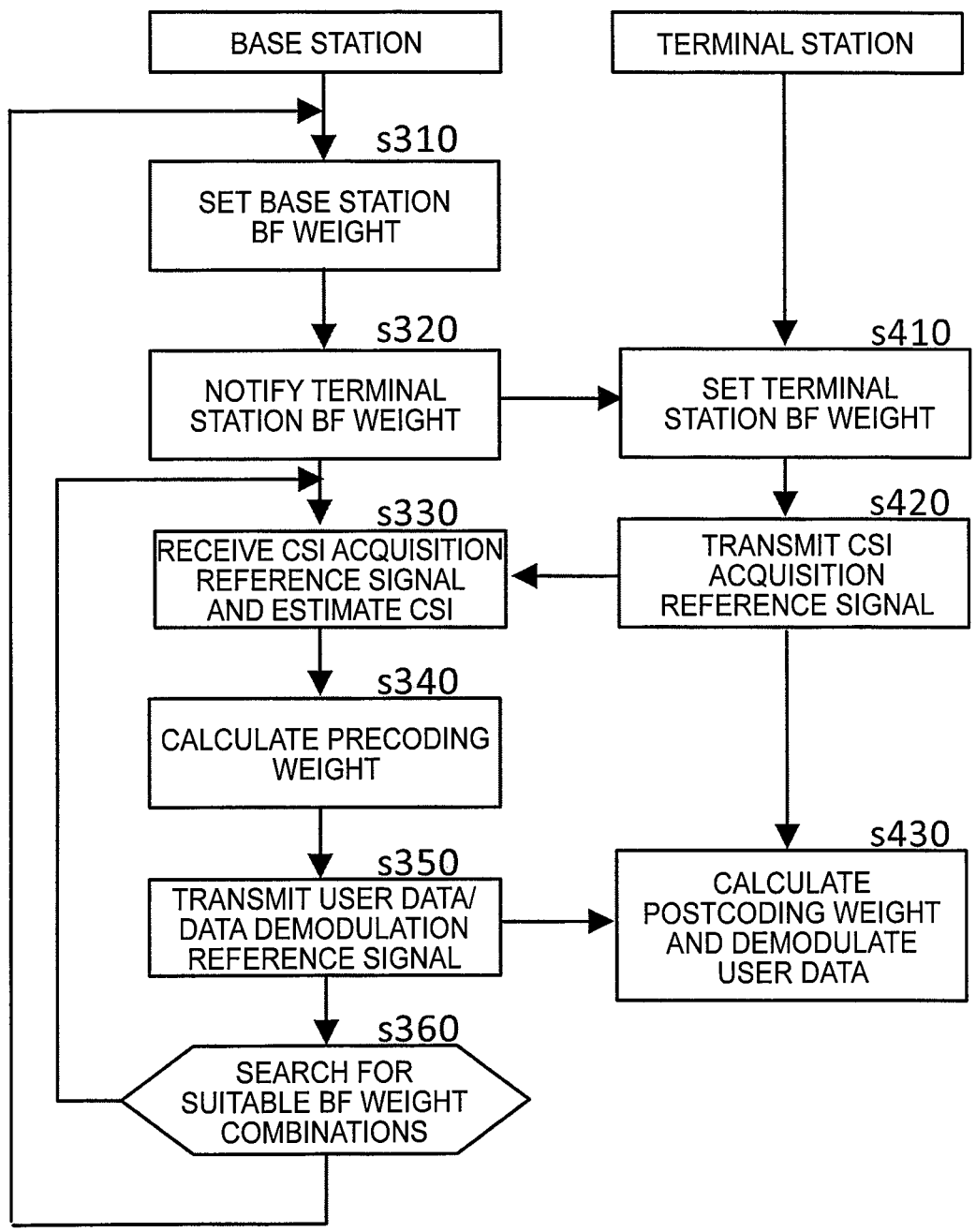
FIG. 10 is a diagram for illustrating a detailed procedure of searching for a suitable BF weight in the first embodiment of the present invention.

FIG. 10 is a diagram for illustrating a detailed procedure for searching for a suitable BF weight in the first embodiment of the present invention. This procedure mainly includes four methods, namely, a BF weight initial setting method, a channel matrix acquisition method, a CSI acquisition reference signal generation method, and a BF weight combination search method.

The BF weight initial setting method corresponds to the processing of Step S310, Step S320, and Step S410. The channel matrix acquisition method corresponds to the processing of Step S420 and Step S330. The CSI acquisition reference signal generation method corresponds to the processing of Step S420. The BF weight combination search method corresponds to the processing of Step S360.

In Step S310, the base station 1 selects, as an initial setting, the combination having a maximum power based on the power characteristic information for the base station-terminal station BF weight combination notified in Step S280. The base station 1 also sets the base station BF weight of the selected combination for all BsSas.

When the BF weight is not the initial setting and has been updated in Step S360 to be described later, the base station 1 individually sets the updated base station BF weight for the BsSa in accordance with details of the update.

In Step S320, the base station 1 generates a terminal station BF weight setting information signal. Specifically, during initial setting, the BS signal generation unit 31 in the base station 1 generates, as the terminal station BF weight setting information signal, the terminal station BF weight of the combination having the maximum power selected in Step S310 in accordance with an instruction from the base station BF weight control/setting unit 30. The BS signal generation unit 31 then notifies the terminal station BF weight setting information signal as the terminal station BF weight to all the UeSas.

When the BF weight is not the initial setting and has been updated in Step S360 to be described later, the base station 1 individually notifies the updated terminal station BF weight for the UeSa 13 in accordance with details of the update.

In Step S410, the terminal station 2 uses the control information analysis unit 19 to decode the terminal station BF weight setting information signal received from the base station 1. The terminal station 2 also sets the terminal station BF weight in the UeSa by using the terminal station BF weight control/setting unit 39 in accordance with the decoding result of the terminal station BF weight setting information signal.

Next, in Step S420, the terminal station 2 uses the UE signal generation unit 41 to generate a CSI acquisition reference signal by utilizing the reversibility between downlinks and uplinks in a TDD system. The generated CSI acquisition reference signal is transmitted with the already set terminal station BF weight.

Figure 11:
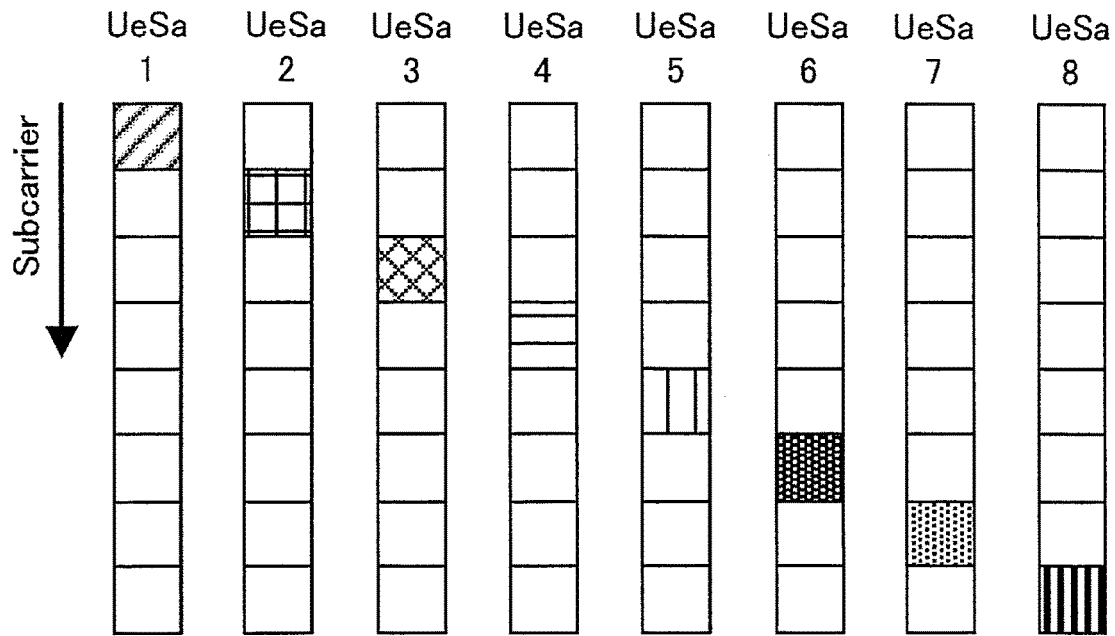
FIG. 11 is an explanatory diagram for illustrating a transmission example of a CSI acquisition reference signal in the first embodiment of the present invention.

FIG. 11 is an explanatory diagram for illustrating a transmission example of the CSI acquisition reference signal in the first embodiment of the present invention. As an example of the CSI acquisition reference signal, as illustrated in FIG. 11, the CSI acquisition reference signal is mapped to a different subcarrier at each UeSa.

Figure 12:
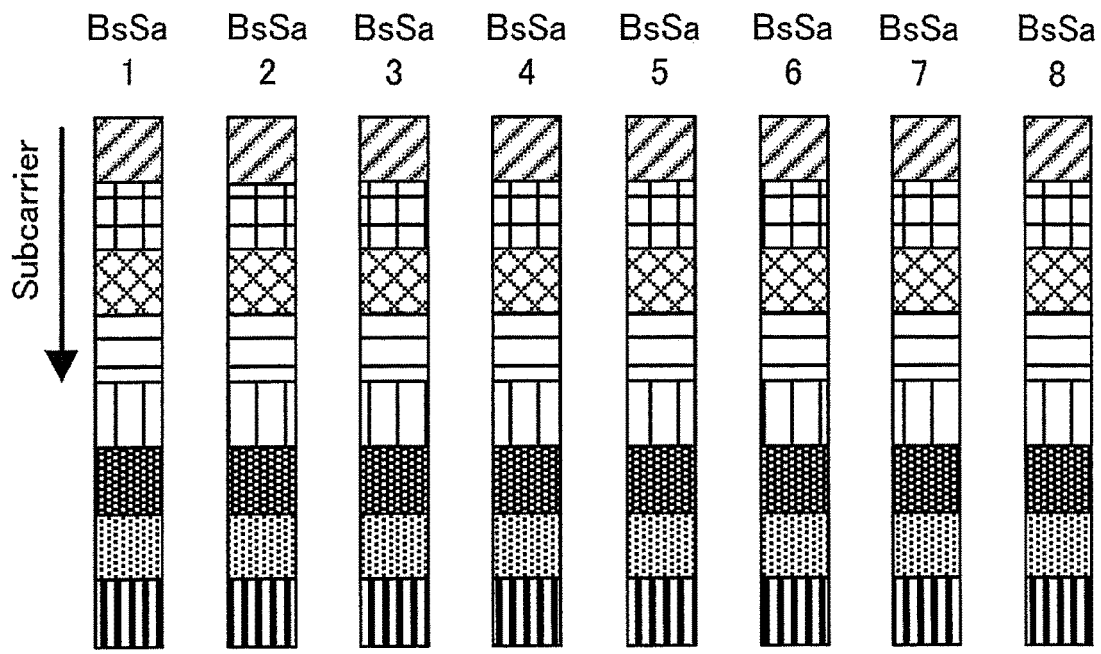
FIG. 12 is an explanatory diagram for illustrating a reception example of the CSI acquisition reference signal in the first embodiment of the present invention.

FIG. 12 is an explanatory diagram for illustrating a reception example of the CSI acquisition reference signal in the first embodiment of the present invention. In Step S330, the base station 1 can obtain a reception signal like that illustrated in FIG. 12. As a result, the BS channel estimation unit 28 in the base station 1 can estimate the channel matrix for all UeSa-BsSa combinations as the following expression (19).

$$H = \begin{bmatrix} h_{1,1} & \cdots & h_{1,N_{BsSa}} \\ \vdots & \vdots & \vdots \\ h_{N_{UeSa},1} & \cdots & h_{N_{UeSa},N_{BsSa}} \end{bmatrix} \quad (19)$$

In this expression, "hi;j" represents a channel coefficient from #i terminal subarray to #j base station subarray.

Next, in Step S340, as the precoding weight P, the base station 1 uses the right singular matrix V of the channel matrix H shown by the following expression (20) estimated by the precoder weight generation unit 37.

$$H = U\Sigma V^H \quad (20)$$

Next, in Step S350, the base station 1 transmits a user data/data demodulation reference signal. Specifically, the precoder unit 33 in the base station 1 multiplies the following user data/data demodulation reference signal vector:

$$s = \begin{bmatrix} s_1 \\ \vdots \\ s_{N_{Str}} \end{bmatrix} \quad (21)$$

generated by the BS signal generation unit 31 and mapped on the OFDM resource by the BS mapping unit 32 by the coding weight P, to thereby generate a transmission signal, and transmits the generated transmission signal to the terminal station 2.

Next, in Step S430, the terminal station 2 performs postcoding weight calculation and user data demodulation. Specifically, the postcoder weight generation unit 38 in the terminal station 2 uses the above-mentioned left singular matrix UH as the postcoding weight to demodulate a reception signal vector r=HVs as in the following expression (22), based on the channel matrix H estimated by the UE channel estimation unit 40 through use of the data demodulation reference signal transmitted from the base station 1 in Step S350.

$$U^H r = U^H U \sum V^H V s \quad (22)$$

-continued $$= \sum s$$
$$= \text{diag}[\lambda_1 \ldots \lambda_{N_{str}}]s$$

Finally, in Step S360, the base station 1 determines whether to update the BF weight by a method described later. When it is determined not to update the BF weight, the processing returns to Step S330, and the base station 1 repeats Step S330 to Step S360, and the terminal station 2 repeats Step S420 to Step S430. Meanwhile, when it is determined to update the BF weight, the processing advances to Step S310.

Figure 13:
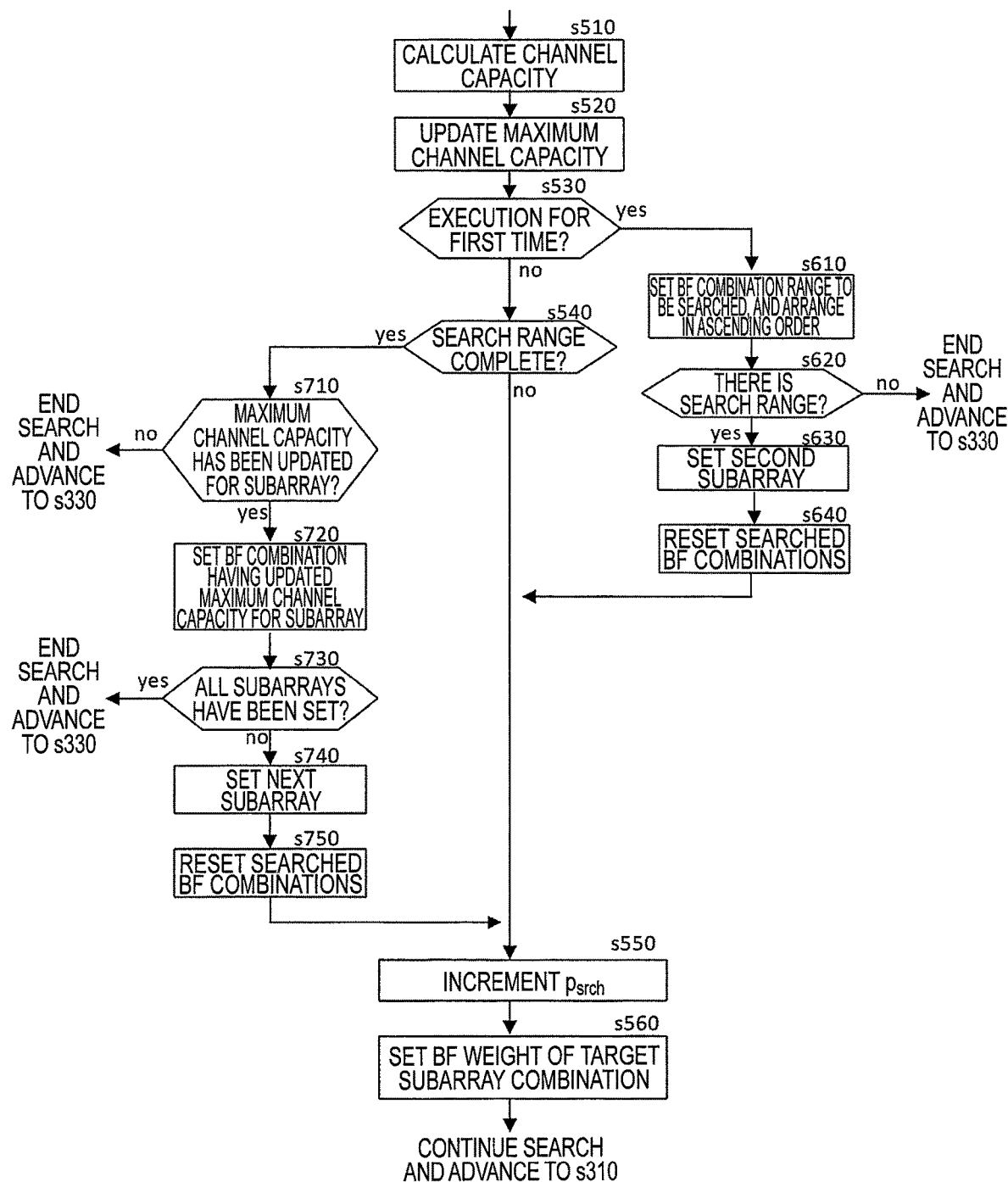
FIG. 13 is a flowchart for illustrating details of a BF weight combination search in the first embodiment of the present invention.

Next, the BF weight combination search method is described in detail. FIG. 13 is a flowchart for illustrating details of the BF weight combination search in the first embodiment of the present invention. This procedure includes two methods, namely, a BF weight search range determination method and a BF weight updatability determination method.

The BF weight search range determination method corresponds to the processing of Step S610. The BF weight updatability determination method corresponds to the processing of Step S510 to Step S540, Step S710, and Step S720.

In Step S510, the base station 1 calculates a channel capacity C based on the following expression through use of the channel matrix H estimated in Step S330.

$$C = \log_2 \det(I + \gamma H H^H) \quad (23)$$

In this expression, I represents a unit matrix, and γ represents a reception signal-to-noise ratio (SNR).

Next, in Step S520, the base station 1 compares the channel capacity C calculated in Step S510 with a maximum channel capacity Cmax. When the processing of this flowchart is performed for the first time, the maximum channel capacity Cmax is 0. In this comparison, when C>Cmax, the base station 1 updates the maximum channel capacity as Cmax=C. When the maximum channel capacity has been updated, the base station 1 stores the BF weight combinations of all subarray combinations.

In Step S530, the base station 1 determines whether or not this suitable BF weight search/weight update is being performed for the first time. When the determination in Step S530 is "yes", the processing advances to Step S610, and when the determination is "no", the processing advances to Step S540.

When the determination in Step S530 is "yes", that is, when the suitable BF weight search/weight update is being performed for the first time, the base station 1 executes the processing of Step S610 and the subsequent steps.

In Step S610, the base station 1 sets a range of the BF combinations to be searched, based on the reception power characteristic received as feedback from the terminal station 2 in Step S280. Specifically, the base station 1 identifies the power value "PBF; maxdB" of the BF weight combination having the maximum power among the power characteristics for all combinations of the base station-terminal station BF weight candidates received as feedback from the terminal station 2.

The base station 1 also extracts, as the BF combinations to be searched, the BF weight combinations having a power characteristic within the following expression.

PBF; min=PBF; max−Prange (dB)

In this expression, Prange represents a parameter that is separately and uniquely defined for the system in advance.

When the power ratio between the maximum eigenvalue $\lambda^2$max and the minimum eigenvalue $\lambda^2$ min of the channel matrix H is the following expression:

$$10\log 10\left(\frac{\lambda_{max}^2}{\lambda_{min}^2}\right) = P_{diff} \text{(dB)} \quad (24)$$

the base station 1 may extract, as the BF combinations to be searched, the BF weight combinations having a power characteristic within the following expression.

PBF; min=PBF; max−Pdiff (dB)

Figure 14:
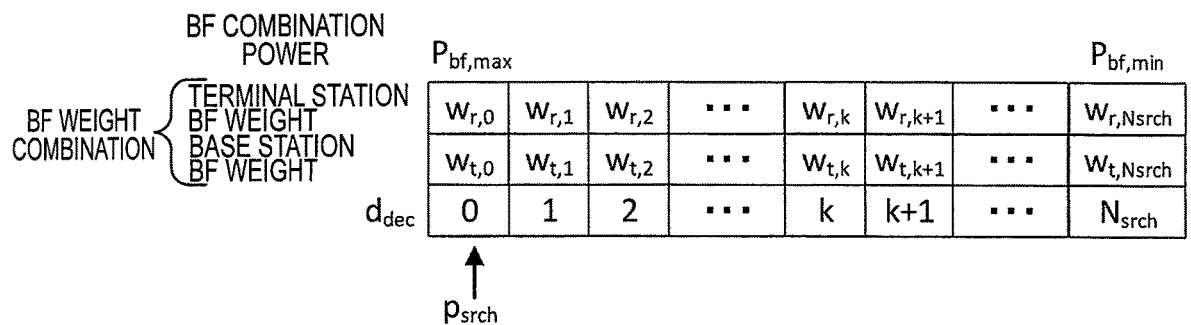
FIG. 14 is a diagram for illustrating an example in which sets of BF weight combinations to be searched are numbered in descending order of power in the first embodiment of the present invention.

The BF weight combination having the maximum power is not a search target. FIG. 14 is a diagram for illustrating an example in which sets of BF weight combinations to be searched are numbered in descending order of power in the first embodiment of the present invention. When the ordered number is represented by ddec, ddec=1 is the ordered number of the BF combination having the next highest power to PBF; max. Further, the number of BF combinations to be searched is represented by Nsrch.

Next, in Step S620, the base station 1 determines whether or not there is a search range. When Nsrch=0, that is, when there is no BF combination to be searched, the result is "no", and the base station 1 ends the search processing, and the processing advances to Step S330. Meanwhile, when Nsrch>0, that is, when there is a BF combination to be searched, the result is "yes", and the base station 1 advances the processing to Step S630.

In this suitable BF weight search, a suitable BF weight is sequentially searched for each subarray combination. A first subarray combination, for example, a combination of BsSa (1) and UeSa (1), is the BF weight combination having the maximum power. In Step S630, the base station 1 sets a second subarray combination as the target for the suitable BF weight search.

Next, in Step S640, the base station 1 resets the searched BF combinations. Specifically, as illustrated in FIG. 14, the base station 1 resets the searched BF combinations by setting a variable psrch indicating the ordered number during the search to psrch=0 for the target subarray combinations of the suitable BF weight search.

When the determination in Step S530 is "no", and when the processing has advanced to Step S540, the base station 1 determines whether or not the search range is complete. When "psrch=Nsrch" indicating completion of the search range, the result is "yes", and the base station 1 advances the processing to Step S710. Meanwhile, when "psrch≠Nsrch", the result is "no", and the base station 1 advances the processing to Step S550.

When the processing advances to Step S710, the base station 1 determines whether or not the maximum channel capacity has been updated for the subarray. Specifically, the base station 1 determines "no" when the maximum channel capacity has not been updated in Step S520 for the subarray combination of the target of the BF weight search. When the determination is "no", the base station 1 assumes that the current BF weight is suitable, ends the search processing, and advances the processing to Step S330.

Meanwhile, when the maximum channel capacity has been updated in Step S520, the base station 1 determines "yes", and advances the processing to Step S720.

When the processing advances to Step S720, the base station 1 sets the BF combination having the updated maximum channel capacity for the subarray. Specifically, when the maximum channel capacity is updated in Step S520, the base station 1 sets the BF weight combination at the time when the maximum channel capacity is updated as the suitable BF combination of the target subarray combination.

Next, in Step S730, the base station 1 determines whether or not all subarrays have been set. When it is determined that that the search of all the subarray combinations is completed, the base station 1 ends the search processing and advances the processing to Step S330. Meanwhile, when the search of all the subarray combinations has not finished and there remains search processing of another subarray combination, the base station 1 advances the processing to Step S740.

When the processing advances to Step S740, the base station 1 increments the number of the subarray combination to be searched, and continues the search for a suitable BF weight for the next subarray combination.

Next, in Step S750, the base station 1 resets the searched BF combinations. Specifically, as illustrated in FIG. 14, the base station 1 resets the searched BF combinations in the same manner as in Step S640 by setting the variable psrch indicating the ordered number during the search to psrch=0 for the subarray combinations to be searched.

Figure 15:
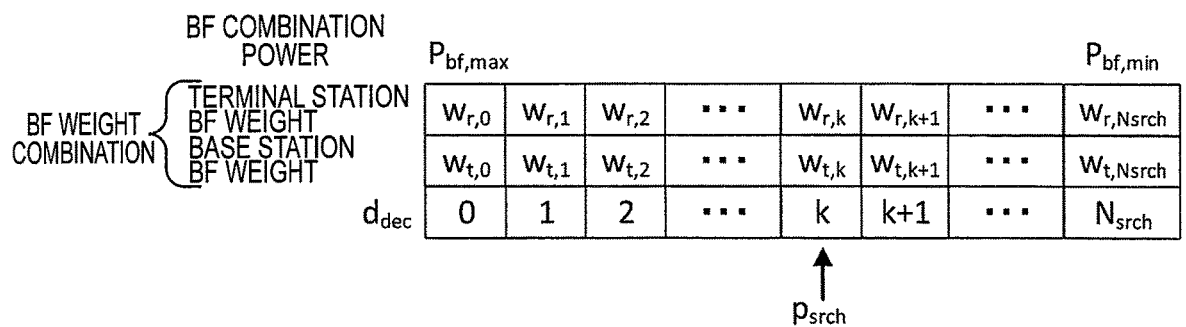
FIG. 15 is a diagram for illustrating an example of a psrch position before incrementation in the first embodiment of the present invention.
Figure 16:
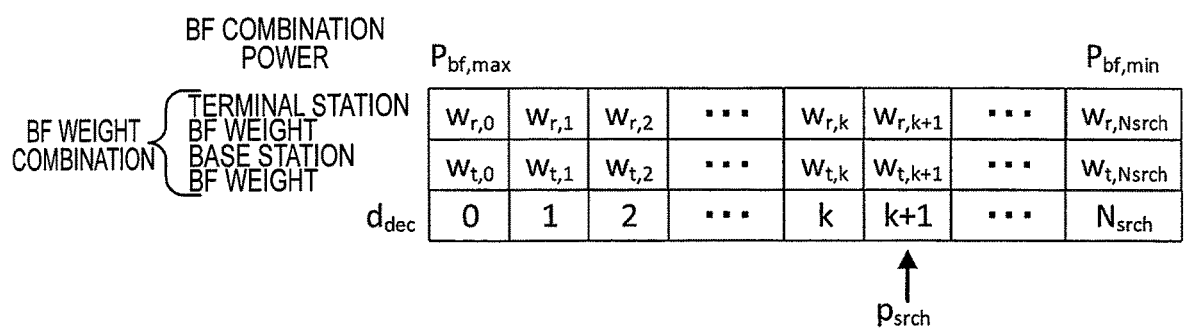
FIG. 16 is a diagram for illustrating an example of a psrch position after incrementation in the first embodiment of the present invention.

Next, in Step S550, the base station 1 increments the variable psrch indicating the ordered number being searched, and changes the candidate BF weight combination. FIG. 15 is a diagram for illustrating an example of the psrch position before incrementation in the first embodiment of the present invention, and FIG. 16 is a diagram for illustrating an example of the psrch position after incrementation in the first embodiment of the present invention.

Finally, in Step S560, the base station 1 sets, as the BF weight combination, the combination of the base station BF weight and the terminal station BF weight indicated by the ordered number psrch during the search as the base station and terminal station BF weights of the target subarray combination being searched.

As described above, the first embodiment has the following two features.
(Feature 1) There is provided the configuration in which a suitable BF weight is set collectively for all antennas by a simple method. As a result, the time from the start of the weight search to the start of communication can be shortened, and wireless resources can be used efficiently.
(Feature 2) There is provided the configuration in which a suitable BF weight is used as an initial value, the channel capacity at the time when the BF weight is changed from that initial value is sequentially evaluated, and a more appropriate BF weight is searched for while communication is being performed. As a result, the BF weight can be sequentially optimized.

Modification examples of the present invention are now described.

(Modification Example 1) Frequency Orthogonal/Code Orthogonal of BF Training Signal In the BF training signal generation method, in this embodiment, there is described a BF training signal having a format in which the reference signals have orthogonal frequencies by arranging the reference signals at different subcarrier positions for each different base station subarray. However, there may also be employed a BF training signal having a format in which the reference signals have orthogo-nal codes by assigning a different diffusion code to the reference signals for each different base station subarray.

(Modification Example 2) FDD (CSI Feedback)/TDD (UL Sounding) of Channel Matrix Acquisition Method In the channel matrix acquisition method, in this embodiment, there is described a method involving acquiring the channel matrix at the base station by transmitting the CSI acquisition reference signal from the terminal station to the base station in the uplink, based on the assumption that a time-division duplex (TDD) system is used. However, based on the assumption of a frequency-division duplex (FDD) system, there may also be employed a method involving acquiring the channel matrix at the terminal station by transmitting the CSI acquisition reference signal from the base station to the terminal station in the downlink, and acquiring the channel matrix at the base station by transmitting information on the acquired channel matrix as feedback from the terminal station to the base station.

(Modification Example 3) FDD (DL/UL Measurement)/TDD (DL/UL Measurement) of BF Weight Combination Quality Measurement Method In the BF weight combination quality measurement method, in this embodiment, there is described a method involving acquiring the power characteristic of a BF weight combination at the terminal station by transmitting a BF training signal from the base station to the terminal station in the downlink, and acquiring the power characteristic at the base station by transmitting the acquired power characteristic as feedback from the terminal station to the base station. However, there may also be employed a method involving acquiring the power characteristic at the base station by transmitting the BF training signal from the terminal station to the base station in the uplink.

REFERENCE SIGNS LIST 3 precoder, 4 base station, 5 channel, 6 terminal station, 7 postcoder

The invention claimed is:
1. A wireless device, comprising:
a base station; and
a terminal station,
the base station including:
a precoder configured to perform digital precoding on a plurality of pieces of parallel user data by using a precoding weight;
a transmission beamformer configured to perform, on a signal on which the digital precoding has been performed, analog base station beamforming for conferring a change in phase and amplitude corresponding to a base station beamforming weight; and
a plurality of transmission antennas configured to transmit the signal on which the analog base station beamforming has been performed,
the terminal station including:
a plurality of reception antennas configured to receive a signal transmitted from the base station and propagated into space;
a terminal station beamformer configured to perform, on the signal received by the plurality of reception antennas, analog terminal station beamforming for conferring a change in phase and amplitude corresponding to a terminal station beamforming weight; and a postcoder configured to reproduce the plurality of pieces of parallel user data by using a postcoding weight to perform digital postcoding on the signal on which the analog terminal station beamforming has been performed, the base station and the terminal station being configured to execute:

a beamforming weight training function for acquiring in advance transmission quality information at a time when a combination of the base station beamforming weight and the terminal station beamforming weight is used, and identifying a suitable beamforming weight; and a suitable beamforming weight search function for searching for, based on the transmission quality information identified by executing the beamforming weight training function, a suitable beamforming weight while performing mutual communication, and executing processing of updating the suitable beamforming weight, wherein the base station and the terminal station include:

a power characteristic measurement processor configured to measure a power characteristic of a combination of beamforming weights by selecting, for each of a plurality of base station subarrays, a candidate base station beamforming weight corresponding to the each of the plurality of base station subarrays from a plurality of base station beamforming weight candidates, selecting, for each of a plurality of terminal station subarrays, a candidate terminal station beamforming weight corresponding to the each of the plurality of terminal station subarrays from a plurality of terminal station beamforming weight candidates, and transmitting and receiving a beamforming training signal in accordance with the selected candidate base station beamforming weight and the selected candidate terminal station beamforming weight; and a quality feedbacker configured to grasp the power characteristic at the base station by transmitting the measured power characteristic as feedback data information from the terminal station to the base station, and wherein the base station and the terminal station are configured to execute the beamforming weight training function, wherein the base station and the terminal station include:

an initial setter configured to apply, by using the power characteristic of the combination of beamforming weights acquired by the quality feedbacker, a combination of the base station beamforming weight and the terminal station beamforming weight at which a maximum power is obtainable, for all subarrays of the base station and all subarrays of the terminal station;

a channel matrix identificator configured to acquire an uplink channel matrix at the base station in accordance with a CSI acquisition reference signal transmitted by the terminal station; and an updater configured to update, based on the uplink channel matrix acquired by the base station, a combination of beamforming weights for each base station subarray and each terminal station subarray, wherein the base station and the terminal station are configured to execute the suitable beamforming weight search function, and wherein the updater includes:

a search range determiner configured to determine a search range of suitable beamforming weights from among the power characteristics of the combinations of beamforming weights acquired by executing the beamforming weight training function; and an updatability determiner configured to determine an updatability of the beamforming weight combinations based on a channel capacity calculated from the uplink channel matrix.

2. A wireless communication control method to be executed in the wireless device of claim 1 by mutual communication between the base station and the terminal station, the wireless communication control method comprising:

executing a beamforming weight training function for acquiring in advance transmission quality information at a time when a combination of a base station beamforming weight and a terminal station beamforming weight is used, and identifying a suitable beamforming weight; and searching for, based on the transmission quality information identified in the executing the beamforming weight training, a suitable beamforming weight while performing mutual communication, and executing processing of updating the suitable beamforming weight, wherein executing the beamforming weight training includes:

selecting, for each of a plurality of base station subarrays, a candidate base station beamforming weight corresponding to the each of the plurality of base station subarrays from a plurality of base station beamforming weight candidates, and selecting, for each of a plurality of terminal station subarrays, a candidate terminal station beamforming weight corresponding to the each of the plurality of terminal station subarrays from a plurality of terminal station beamforming weight candidates;

measuring a power characteristic of a combination of beamforming weights by transmitting and receiving a beamforming training signal in accordance with the selected candidate base station beamforming weight and the selected candidate terminal station beamforming weight; and grasping the power characteristic at the base station by transmitting the measured power characteristic as feedback data information from the terminal station to the base station, wherein the searching includes:

applying, by using the power characteristic of the combination of beamforming weights acquired in the grasping the power characteristic, a combination of the base station beamforming weight and the terminal station beamforming weight at which a maximum power is obtainable, for all subarrays of the base station and all subarrays of the terminal station;

acquiring an uplink channel matrix at the base station in accordance with a CSI acquisition reference signal transmitted by the terminal station; and updating, based on the uplink channel matrix acquired by the base station, a combination of beamforming weights for each base station subarray and each terminal station subarray, and wherein the updating includes:

determining a search range of suitable beamforming weights from among the power characteristics of the combinations of beamforming weights acquired by executing the beamforming weight training function; and
determining an updatability of the beamforming weight combinations based on a channel capacity calculated from the uplink channel matrix.

* * * * *